United States Patent
Liu et al.

(10) Patent No.: US 8,787,240 B2
(45) Date of Patent: Jul. 22, 2014

(54) PEER-TO-PEER COMMUNICATION PROTOCOL FOR RELAY ENHANCED CELLULAR WIRELESS COMMUNICATION SYSTEMS

(75) Inventors: Yong Liu, Santa Clara, CA (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 491 days.

(21) Appl. No.: 12/422,122

(22) Filed: Apr. 10, 2009

(65) Prior Publication Data

US 2010/0260093 A1 Oct. 14, 2010

(51) Int. Cl.
  H04B 7/14 (2006.01)
  H04J 1/10 (2006.01)
  H04J 3/08 (2006.01)
  H04W 4/00 (2009.01)
  H04B 7/212 (2006.01)

(52) U.S. Cl.
  USPC ............ 370/315; 370/329; 370/322; 370/348

(58) Field of Classification Search
  USPC .................................. 370/329, 315, 322, 348
  See application file for complete search history.

(56) References Cited

U.S. PATENT DOCUMENTS

| | | | | |
|---|---|---|---|---|
| 2004/0043782 | A1* | 3/2004 | Gupta | 455/517 |
| 2008/0095195 | A1* | 4/2008 | Ahmadi et al. | 370/478 |
| 2009/0116430 | A1* | 5/2009 | Bonta et al. | 370/329 |
| 2009/0247072 | A1* | 10/2009 | Nakamura | 455/11.1 |
| 2009/0303918 | A1* | 12/2009 | Ma et al. | 370/315 |
| 2010/0189048 | A1* | 7/2010 | Baker et al. | 370/329 |

OTHER PUBLICATIONS

Genc, V.; Murphy, S.; Yang Yu; Murphy, J.; , "IEEE 802.16J relay-based wireless access networks: an overview," Wireless Communications, IEEE , vol. 15, No. 5, pp. 56-63, Oct. 2008.*

Relay Task Group of IEEE 802.16, "P802.16j Baseline Document for Draft Standard for Local and Metropolitan Area Networks, Part 16: Air Interface for Fixed and Mobile Broadband Wireless Access Systems, Multihop Relay Specification (802.16j-06/026r2)," IEEE 802. 16 Working Group, Feb. 9, 2007, pp. 1-58, United States.

IEEE Computer Society et al., "802.16™ IEEE Standard for Local and Metropolitan Area Networks, Part 16: Air Interface for Fixed Broadband Wireless Access Systems," IEEE, Oct. 1, 2004, pp. i-857, New York, United States.

Genc, V. et al., "IEEE 802.16j Relay-Based Wireless Access Networks: An Overview," IEEE Wireless Communications, vol. 15, No. 5, IEEE Wireless Communications, IEEE, Oct. 2008, pp. 56-63, United States.

Peters, S.W. et al., "The Future of WiMAX: Multihop Relaying with IEEE 802.16j," IEEE Communications Magazine, IEEE, Jan. 2009, pp. 2-9, United States.

* cited by examiner

*Primary Examiner* — Brandon Renner
*Assistant Examiner* — Kodzovi Acolatse
(74) *Attorney, Agent, or Firm* — Kenneth L. Sherman, Esq.; Michael Zarrabian, Esq.; Sherman & Zarrabian LLP

(57) ABSTRACT

A method and system for communication between mobile stations in a wireless relay enhanced cellular communication system. One implementation involves providing a communication resource allocation for peer-to-peer (P2P) communication between a pair of mobile stations during a P2P enhanced time frame wherein one mobile station serves a role as a transparent relay station (MRS) and another mobile station serves a role as a peer mobile station in the pair; and delivering resource allocation information comprising communication periods and frequency subcarriers to the pair of mobile stations, for the mobile station pair to conduct P2P communication therebetween in the P2P enhanced time frame.

42 Claims, 16 Drawing Sheets

To FIG. 2B (Cont.) ⇒

| Designation | Applicability | PHY specification | Options | Duplexing alternative |
|---|---|---|---|---|
| WirelessMAN-SC™ | 10-66 GHz | 8.1 | - | TDD<br>FDD |
| WirelessMAN-SCa™ | Below 11 GHz licensed bands | 8.2 | AAS (6.3.7.6)<br>ARQ (6.3.4)<br>STC (8.2.1.4.3)<br>mobile | TDD<br>FDD |
| WirelessMAN-OFDM™ | Below 11 GHz licensed bands | 8.3 | AAS (6.3.7.6)<br>ARQ (6.3.4)<br>Mesh (6.3.6.6)<br>STC (8.3.8)<br>mobile | TDD<br>FDD |
| WirelessMAN-OFDMA | Below 11 GHz licensed bands | 8.4 | AAS (6.3.7.6, 8.4.4.6)<br>ARQ (6.3.4)<br>HARQ (6.3.17)<br>STC (8.4.8)<br>mobile<br>Multihop relay (1.4.2) | TDD<br>FDD |
| WirelessHUMAN™ | Below 11 GHz license-exempt bands | [8.2, 8.3 or 8.4] and 8.5 | AAS (6.3.7.6)<br>ARQ (6.3.4)<br>Mesh (6.3.6.6)<br>(with 8.3 only)<br>STC (8.2.1.4.3/8.3.8/8.4.8) | TDD |

FIG. 5

| Syntax | Size |
|---|---|
| UL-MAP_Message_Format() { | |
|     Management Message Type = 3 | 8 bits |
|     Uplink Channel ID | 8 bits |
|     UCD Count | 8 bits |
|     Allocation Start Time | 32 bits |
|     Begin PHY Specific Section { | |
|         for (*i*= 1; *i* <=*n*; *i*++) { | |
|             UL-MAP_IE() | variable |
|         } | |
|     } | |
|     if !(byte boundary) { | |
|         Padding Nibble | 4 bits |
|     } | |
| } | |

FIG. 7A

| Syntax | Size |
|---|---|
| P2P-MAP_Message_Format :( ) { | |
| P2P-MAP message type number | 8 bits |
| P2P Channel ID | 8 bits |
| UCD Count | 8 bits |
| Start point of the resource block | 32 bits |
| Begin PHY Specific Section { | |
| for ($i= 1; i <=n; i++$) { | |
| UL-MAP_IE() | variable |
| } | |
| } | |
| if !(byte boundary) { | |
| Padding Nibble | 4 bits |
| } | |
| } | |

Bandwidth Allocation: { Begin PHY Specific Section ... }

PEER-TO-PEER COMMUNICATION PROTOCOL FOR RELAY ENHANCED CELLULAR WIRELESS COMMUNICATION SYSTEMS

FIELD OF THE INVENTION

The present invention relates to wireless cellular communication and in particular to relay enhanced cellular communication systems.

BACKGROUND OF THE INVENTION

A typical cellular communication system includes one or more wireless base stations and multiple wireless mobile stations, as shown in FIG. 1A. Each base station (BS) defines a cell of coverage, where each mobile station (MS) can communicate with a BS via a BS→MS link while within communication range of the BS cell coverage. In many cellular systems, radio resource management (RRM) for orthogonal frequency division multiple access (OFDMA)-based cellular systems is utilized. Such systems address resource allocations (e.g., frequency, time, power), among BS→MS links (i.e., transmission channels defined by frequency carriers, spreading codes or time slots).

In a Relay Enhanced Cellular (REC) system, wireless relay stations (RSs) are deployed to improve wireless (e.g., radio frequency) link quality and/or extend cell coverage. For example, RSs have been used for improving throughput, coverage, and spectrum efficiency of cellular systems. FIG. 1B shows an example cellular system including a base station BS and multiple mobile stations (MSs) and relay stations (RS1, . . . , RS6). A two-hop transmission takes place between a BS and MS via a RS, wherein a RS may be an MS itself. The introduction of relay stations brings forth new challenges to the RRM design. RRM for relay enhanced cellular (REC) systems has to address resource allocations among BS→MS, BS→RS, and RS→MS communication links.

The IEEE P802.16j (IEEE 80216j) relay network standard defines two types of relay stations (or relay modes of operation): Transparent and non-transparent. FIG. 2A shows IEEE P802.16j communication time frame structures for a transparent relay station (transparent RS), as described in "IEEE 802.16J Relay-Based Wireless Access Networks: An Overview", Vasken Genc, Sean Murphy, Yang Yu, and John Murphy, University College Dublin, School Of Computer Science And Informatics, IEEE Wireless Communications, October 2008. FIG. 2B shows said time frame structure wherein a transparent RS serves those MSs that can decode the control information from the BS. A transparent RS need not transmit control information itself. A benefit of relaying with a transparent RS is capacity enhancement for the REC system.

FIG. 3A shows a IEEE P802.16j communication time frame structure for a non-transparent relay station (non-transparent RS), as described in "IEEE 802.16J Relay-Based Wireless Access Networks: An Overview", Vasken Genc, Sean Murphy, Yang Yu, and John Murphy, University College Dublin, School Of Computer Science And Informatics, IEEE Wireless Communications, October 2008. FIG. 3B shows said time frame structure, wherein a non-transparent RS serves mobile stations that cannot decode the control information from the BS. The non-transparent RS must transmit control information at the beginning of the communication time frame. Each MS will have an implicit "understanding" that the non-transparent RS is actually a base station. A benefit of relaying with a non-transparent RS is coverage extension for the REC system.

BRIEF SUMMARY OF THE INVENTION

The present invention provides a method and system for communication between mobile stations in a wireless relay enhanced cellular communication system. One embodiment involves providing a communication resource allocation for peer-to-peer (P2P) communication between a pair of mobile stations during a P2P enhanced time frame wherein one mobile station serves a role as a transparent relay station (MRS) and another mobile station serves a role as a peer mobile station in the pair; and delivering resource allocation information to the pair of mobile stations, for the mobile station pair to conduct P2P communication therebetween in the P2P enhanced frame.

These and other features, aspects and advantages of the present invention will become understood with reference to the following description, appended claims and accompanying figures.

BRIEF DESCRIPTION OF THE DRAWINGS

FIG. 5 shows an IEEE 802.16j standard definition of a Point-to-MultiPoint (PMP) operation mode and an optional Mesh mode for REC systems.

FIG. 7A shows an example control message for communication of resource allocation and schedule for communication in a REC system.

FIG. 7B shows an example control message for communication of resource allocation and schedule for Peer-to-Peer communication between a pair of mobile stations in a REC system, according to an embodiment of the invention.

DETAILED DESCRIPTION OF THE INVENTION

Figure 4:
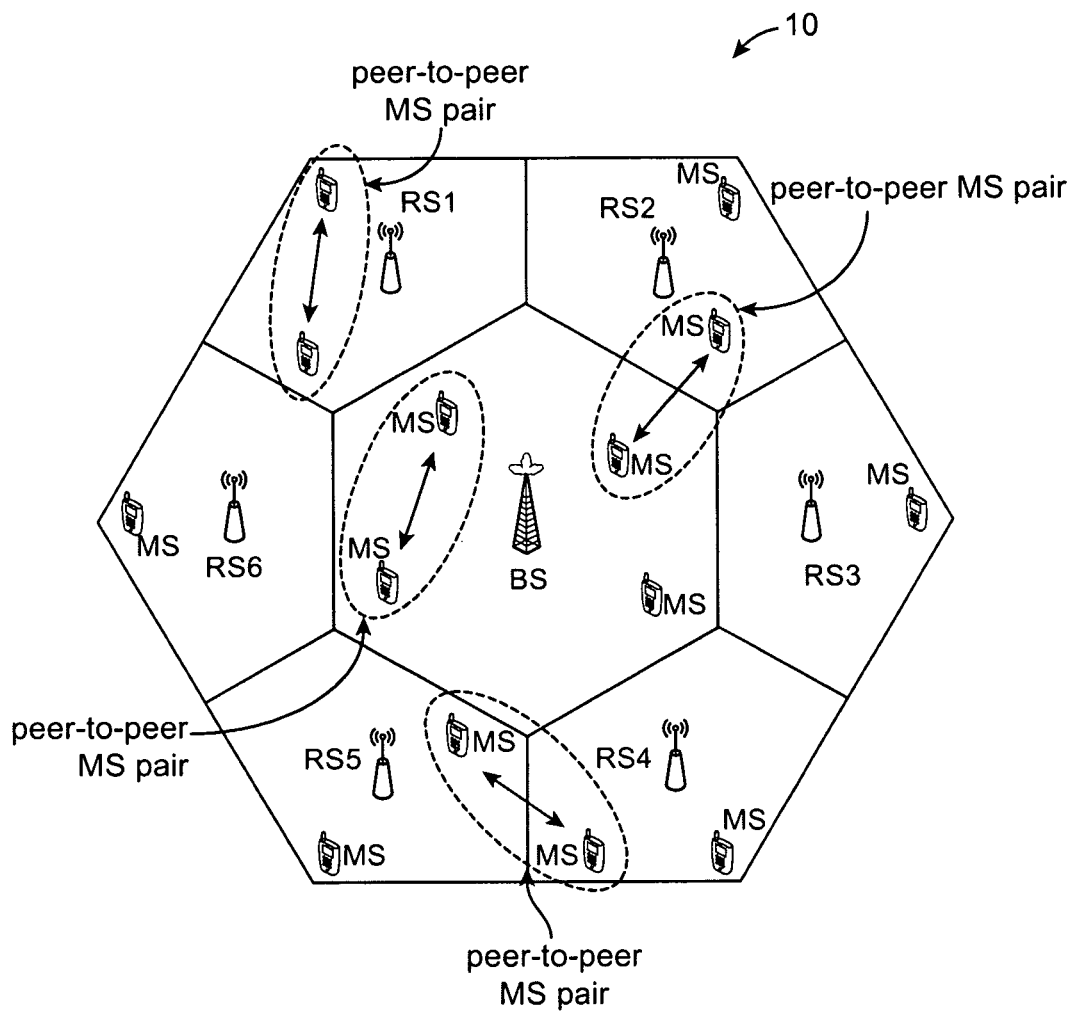
FIG. 4 shows a functional block diagram of a relay enhanced cellular wireless communication system implementing a Peer-to-Peer (P2P) communication protocol between a pair of mobile stations, according to an embodiment of the invention.

The present invention provides a peer-to-peer (P2P) communication protocol in a relay enhanced cellular wireless communication system. Such a system comprises a wireless base station, one or more wireless relay stations and multiple wireless mobile stations. One embodiment of the present invention provides a peer-to-peer communication protocol that utilizes a modification of the IEEE P802.16j transparent relay station communication mechanism (frame structure) to support peer-to-peer communication among mobile stations. FIG. 4 shows an example relay enhanced cellular (REC) wireless system 10 implementing a peer-to-peer communication protocol for peer-to-peer (i.e., direct) communication between wireless mobile station pairs, according to the invention.

The peer-to-peer communication protocol treats one of the peer mobile stations in a peer-to-peer communication pair as a transparent relay station (transparent RS), and utilizes the transparent relay mechanism specified in the IEEE P802.16j standard to enable peer-to-peer communication among the mobile station pair.

The resource allocation involves both time and frequency carriers. A general communication frame is for all communications, including P2P communication according to the invention. P2P communication uses only an allocated resource block within the communication frame, wherein the allocated resource block is termed hereinbelow as a P2P enhanced frame for P2P communication. A REC communication frame includes all uplink and downlink resource allocation/usage for the entire REC system. A P2P enhanced frame is a REC communication frame that enables P2P communications. Specifically, P2P communication only occupies one or more resource blocks within said REC communication frame.

The peer-to-peer communication protocol employs a frame structure for the P2P enhanced frame according to the invention to enable peer-to-peer communications between mobile stations in the REC system 10.

A transparent RS defined in IEEE P802.16j does not transmit control information, and does not participate in resource scheduling. A transparent RS is a wireless device that simply relays data and certain management messages between the BS and mobile stations. Using a peer-to-peer communication protocol according to the invention, a mobile station is configured as a transparent RS, wherein the mobile station may communicate directly with adjacent mobile stations, and at the same time, maintain usual communication with the wireless base station (BS) or other relay stations (RSs).

FIG. 4 shows four different peer-to-peer communication scenarios in the REC system 10. The peer mobile stations may be located in the same cell (including the base station cell or relay cells), or different cells. Each wireless mobile station (MS) is able to receive control information from its corresponding serving station. A serving station may be the BS or a non-transparent relay station (non-transparent RS) in the REC system 10. The resource allocation for peer-to-peer (P2P) communications is either determined by the BS in a central scheduling mode, or jointly determined by the serving stations in a distributed scheduling mode. The communication resource allocation is transmitted to the peer MSs via a P2P-MAP message (described further below), which is included as part of the control information transmitted at the start of each P2P enhanced frame. The P2P-MAP message also specifies the role of each peer MS (i.e., a relay station role or a mobile station role). In order to support P2P communication in the REC system 10, in one embodiment the peer-to-peer communication protocol provides P2P enhanced frames which are modified versions of the frame structure of the non-transparent relay system shown in FIGS. 3A-B.

The IEEE 802.16j standard defines a Point-to-MultiPoint (PMP) operation mode and an optional Mesh mode for REC systems. In the Mesh mode, traffic can be routed through subscriber stations (SSs) and also may occur directly between SSs (SSs correspond to MSs, wherein SSs are typically fixed, and in one example every residence may include a fixed SS to communicate with a BS, replacing DSL for broadband data communication). To enable mesh operations, SSs include additional functions such as mesh frame support, distributed scheduling, etc. As shown in the table 20 in FIG. 5, the Mesh mode can be supported by WirelessMAN-OFDM PHY and WirelessHUMAN PHY specified by IEEE 802.16j. However, Mesh mode is not supported by the WirelessMAN-OFDMA PHY, which is the major interface for mobile Worldwide Interoperability for Microwave Access (WiMAX). The IEEE P802.16j standard specifies a Mobile Multihop Relay (MMR) mode associated with transparent and non-transparent relay stations. The IEEE P802.16j standard is fully compatible with the PMP mode and can support IEEE 802.16e mobile stations. As shown in FIG. 5, the MMR mode is based on the WirelessMAN-OFDMA PHY. In the MMR mode, traffic can be routed through relay stations. However, traffic cannot flow directly between mobile stations.

As noted, the peer-to-peer communication protocol according to the present invention employs the IEEE P802.16j transparent relay communication mechanism to support peer-to-peer communication among mobile stations. The peer-to-peer communication protocol is fully compatible with the PMP and MMR mode, based on the WirelessMAN-OFDMA PHY, and is different from the IEEE 802.16 Mesh mode which is supported by the WirelessMAN-OFDM PHY and WirelessHUMAN PHY. The peer-to-peer communication protocol according to the invention provides direct communications among mobile stations of a REC system. The peer-to-peer communication protocol provides the flexibility for mobile stations (using the WirelessMAN-OFDMA PHY) to communicate directly with one another under the PMP and MMR modes.

Figure 1B:
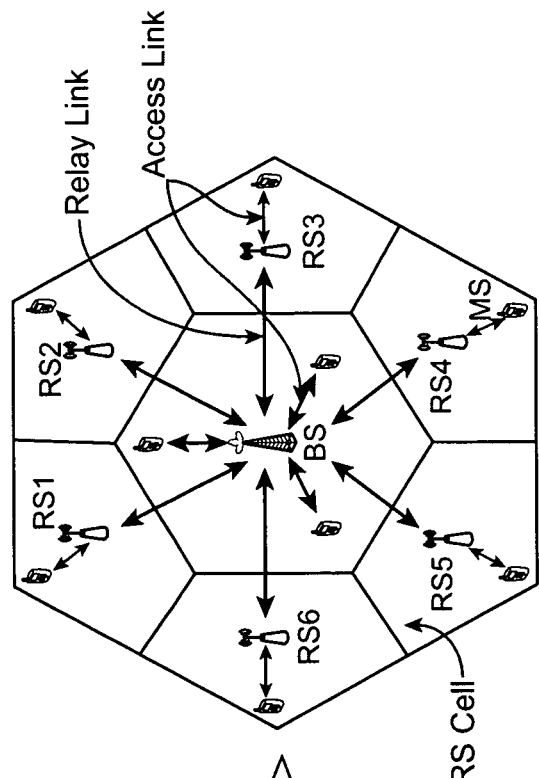
FIG. 1B shows a typical relay enhanced cellular (REC) communication system.
Figure 1A:
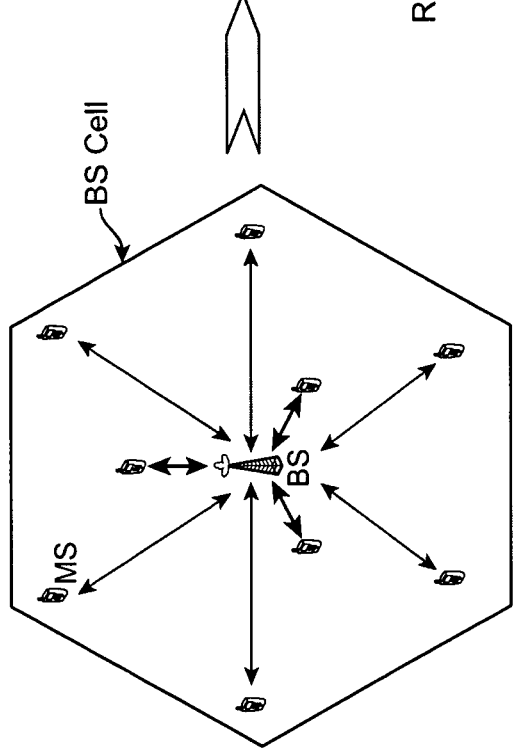
FIG. 1A shows a typical cellular communication system.
Figure 2A:
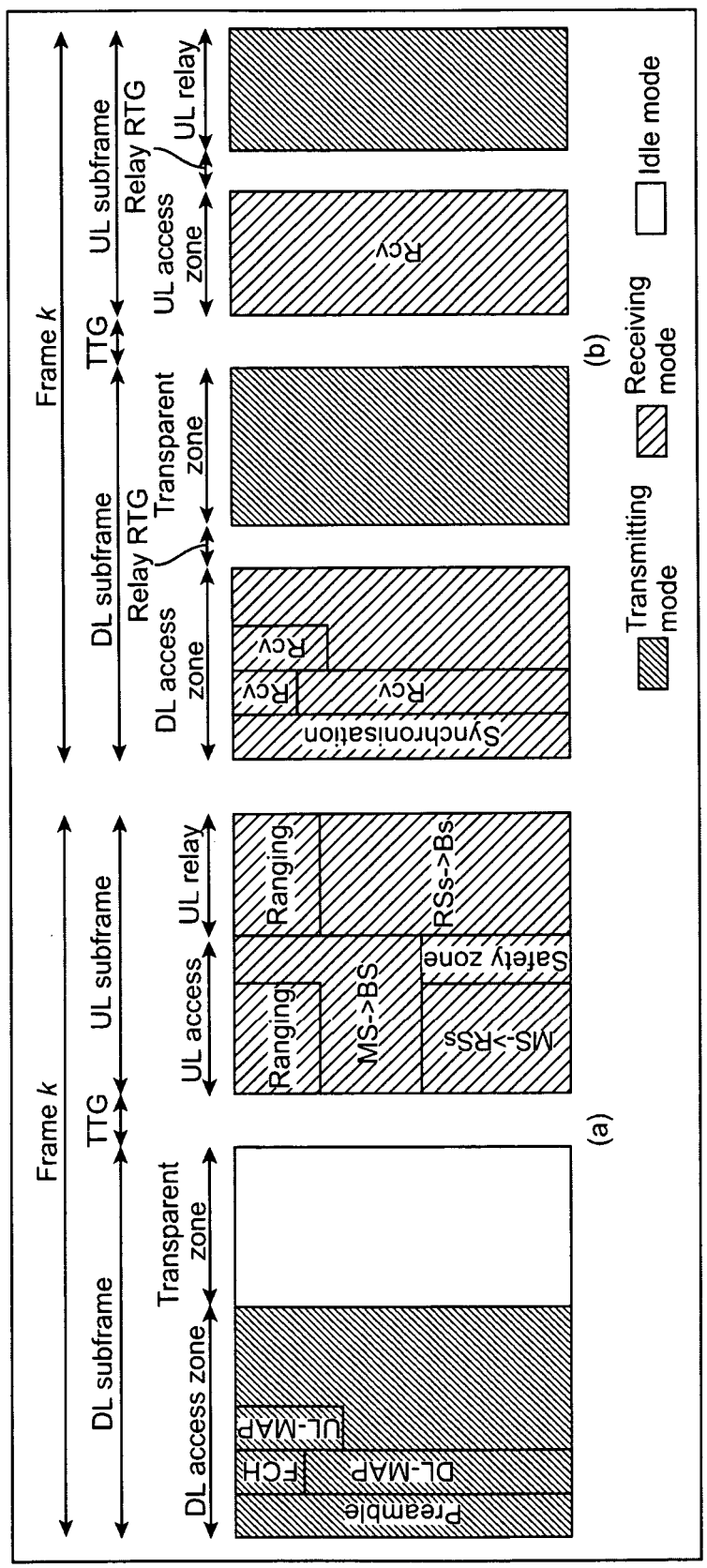
FIGS. 2A-B show IEEE P802.16j communication time frame structures for a transparent relay station (transparent RS).
Figure 2B:
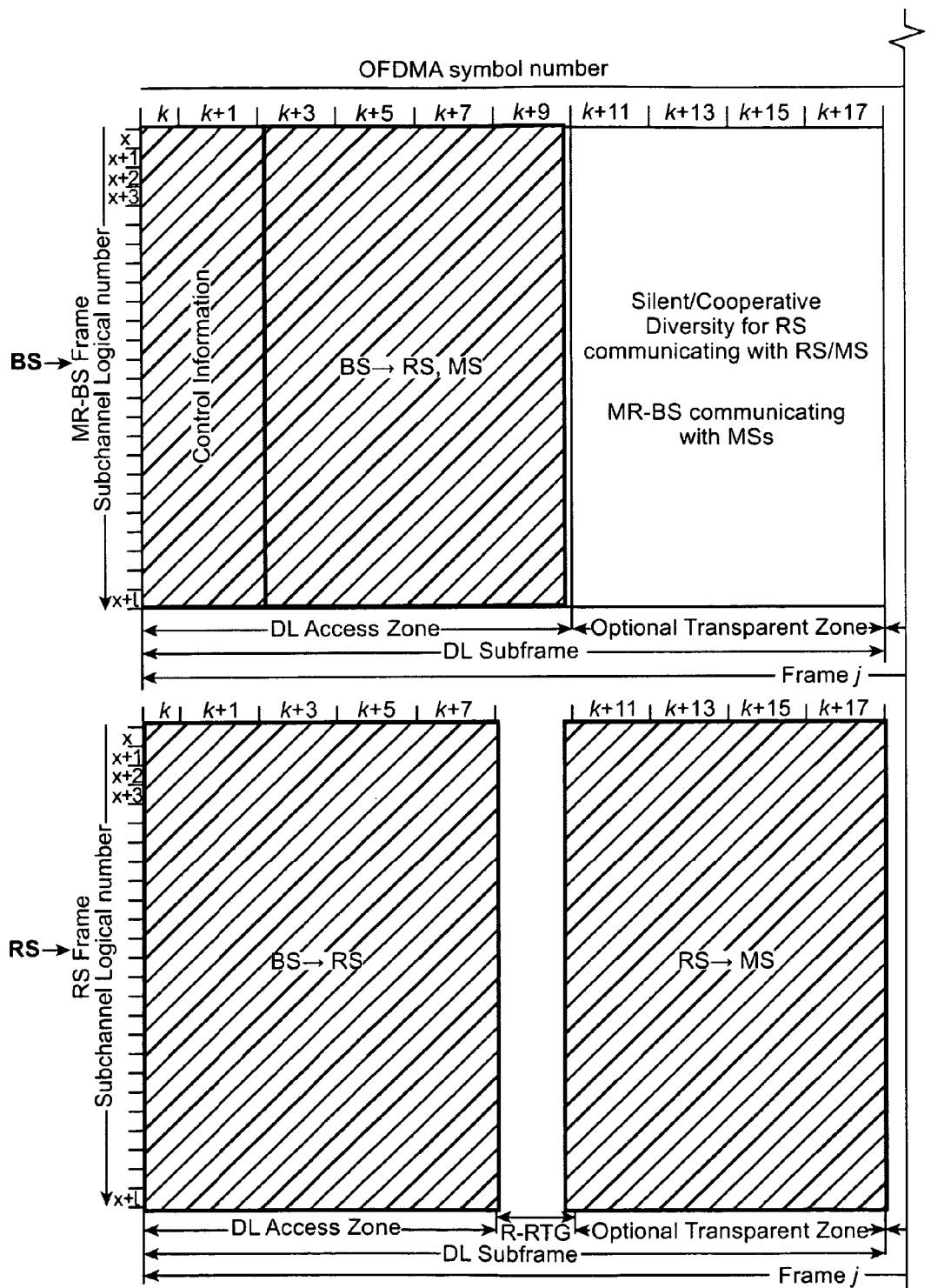
Figure 2B:
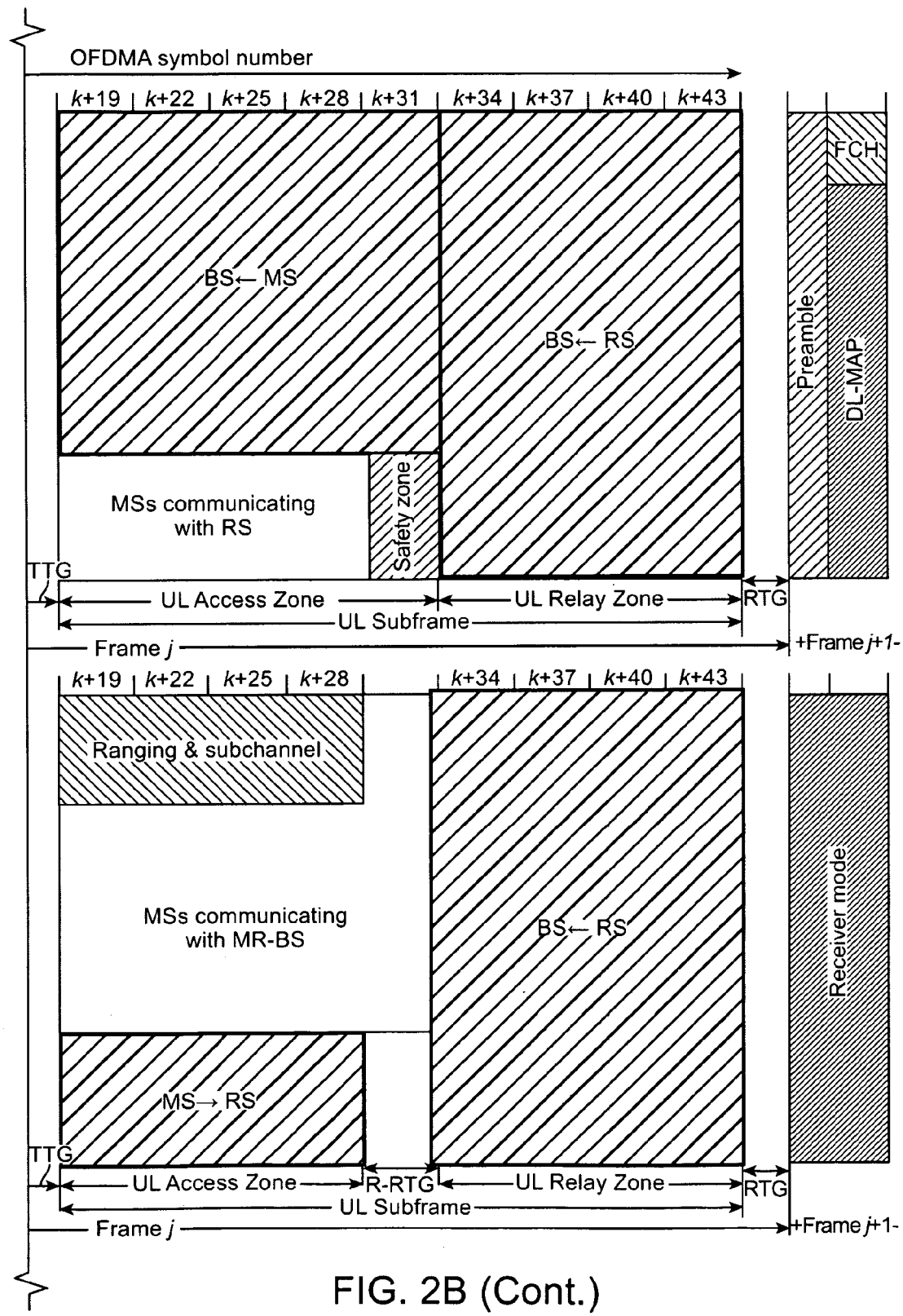
Figure 3A:
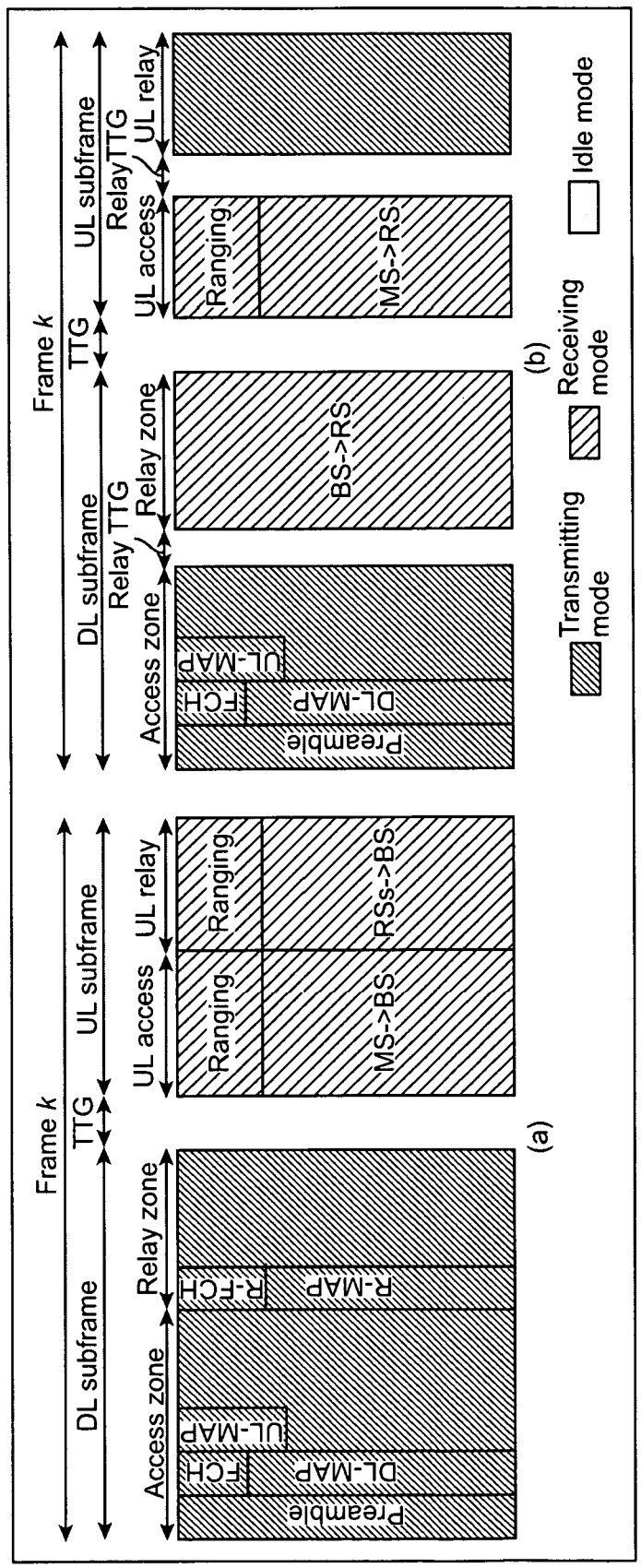
FIGS. 3A-B show IEEE P802.16j communication time frame structure for a non-transparent relay station (non-transparent RS).
Figure 3B:
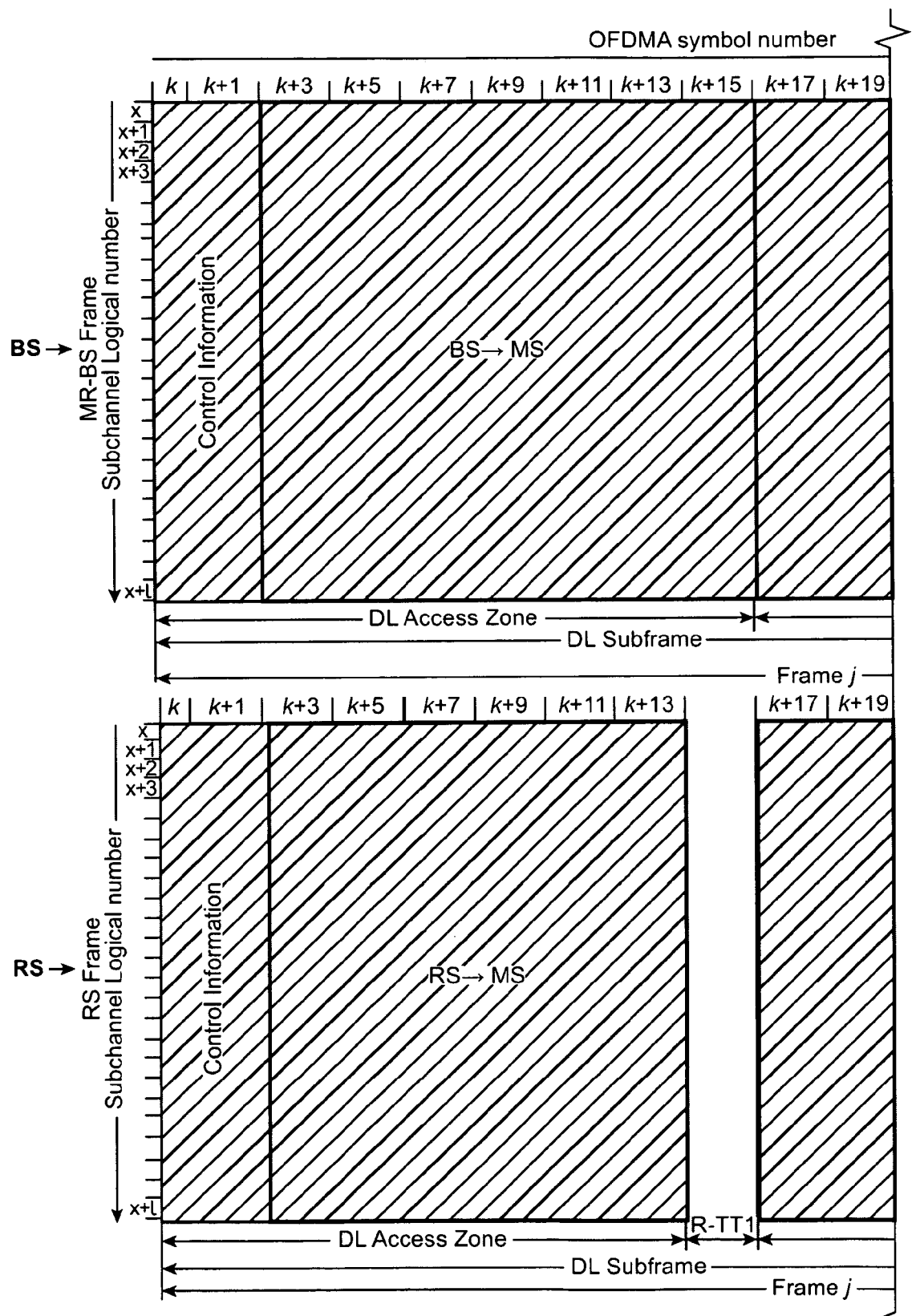
Figure 3B:
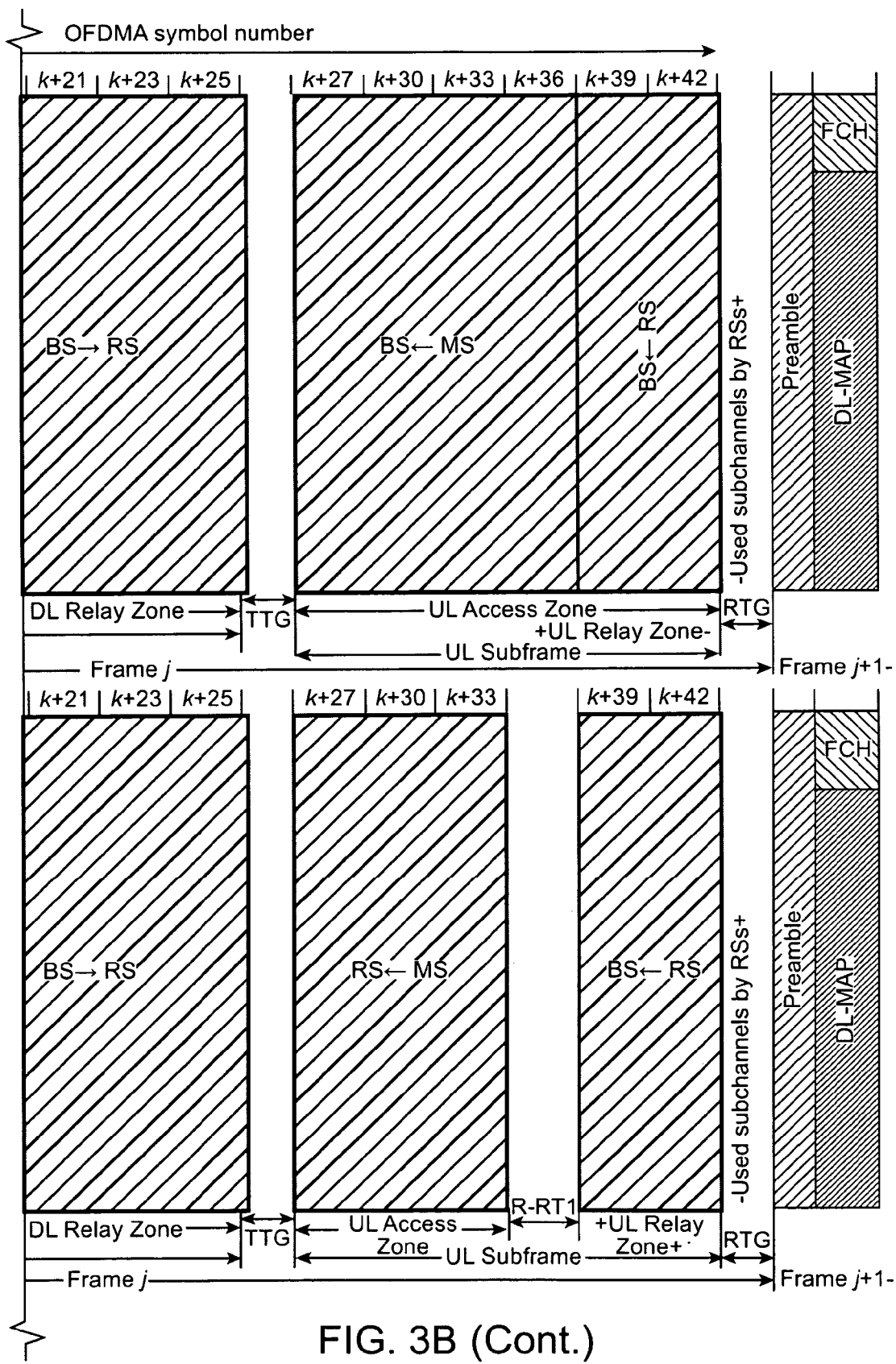

As noted, in order to support P2P communication in the REC system 10, the peer-to-peer communication protocol provides P2P enhanced frames which are modified versions of the frame structure of the non-transparent relay system shown in FIGS. 3A-B. In the example shown in FIG. 3B, resources are assigned to a first MS to data communication with an RS, wherein the RS may forward that data to the BS. A first implementation of a peer-to-peer communication protocol according to the invention provides one-way communication between mobile stations in each P2P pair in each P2P enhanced frame. As shown by example in FIG. 6, a P2P enhanced frame structure 30 provides a resource allocation map for P2P communication in the REC wireless communication system 10. The resource map provides resource allocations including communication time periods and frequency subcarriers. In the example shown in FIG. 6, resources are assigned to a first MS to communicate with a second MS as the destination of the data from the first MS.

Peer mobile stations communicate only in the UL access zone in a P2P enhanced frame. For each peer-to-peer mobile station pair, one of the mobile stations serves as a transparent RS (i.e., MRS), and the other mobile station serves as a mobile station (i.e., peer MS) associated with the MRS. Within one P2P enhanced frame, only one-way communication (e.g., peer MS to MRS (MS→MRS)) can be conducted. For two-way communication, the peer mobile stations alternately exchange their transparent RS vs. mobile station roles in each subsequent P2P enhanced frame 30. As such, in a set of example subsequent P2P enhanced frames the P2P communication can include: MS1→MS2(MRS), MS2→MS1 (MRS), MS1→MS2(MRS), etc.

For peer-to-peer communication between a pair of mobile stations in the REC system, either the BS determines the resource allocation for the REC system, or all serving stations (including the BS or RSs) jointly determine allocation of resource blocks for peer-to-peer communications (BS is one type of serving station). The process of resource allocation for communication resource allocations according to the invention jointly considers data traffic demands and available resources in time, frequency and space domains. In one example, a resource block comprises a time period (horizontal axis in FIG. 6) and frequency subcarriers (vertical axis in FIG. 6).

Figure 6:
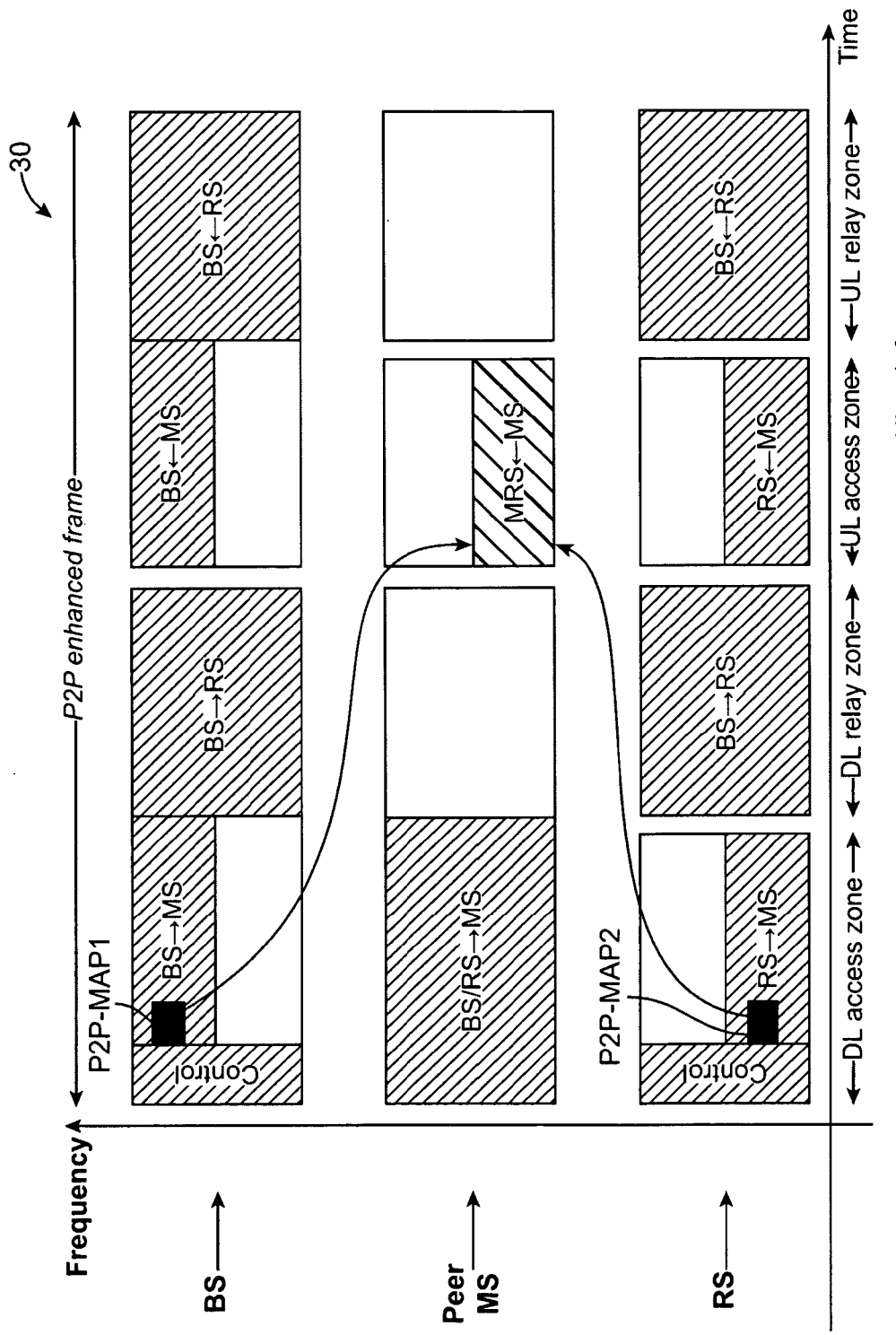
FIG. 6 shows an example P2P enhanced frame for Peer-to-Peer communication, providing a resource allocation map and schedule for Peer-to-Peer communication between a pair of mobile stations, according to an embodiment of the invention.

Once communication resource allocations are determined, resource mapping information for resource allocation is first delivered to the corresponding serving stations. FIG. 6 shows an allocated frame (i.e., P2P enhanced frame). The serving stations then transmit a P2P-MAP message to the mobile station pair at the beginning of the allocated P2P enhanced frames. The P2P-MAP message guides the communications between each mobile station pair in the UL access zone. The P2P-MAP message can be a standalone message or an extension of an UL-MAP message. The peer-to-peer MS pair then communicates according to the resource allocation. Serving stations coordinate with one another for joint decision make in resource allocation. The BS may serve as a central controller to make final resource allocation decisions, in which case the BS then delivers the resource allocation information to other serving stations.

In FIG. 6, a P2P-MAP message is sent from serving stations to the P2P MS pair. If one or both MSs are directly served by the BS, the P2P-MAP message (i.e., P2P-MAP1) is sent from the BS to the MSs. If one or both MSs are served by a non-transparent RS, the P2P-MAP message (i.e., P2P-MAP2) is forwarded by the RS to the MSs. A UL-MAP provides resource allocation in UL zones, and a DL-MAP provides resource allocation in DL zones.

FIG. 7A shows a UL-MAP message control message 35 for communication of resource allocation and schedule for communication in a REC system. FIG. 7B shows an example control message 40 as a P2P-MAP message for communication of resource allocation and schedule for P2P communication between a pair of mobile stations in a REC system, according to an embodiment of the invention. In the message 40, the P2P channel ID indicates a unidirectional (one-way) communication channel between a peer-to-peer mobile station pair. The P2P channel ID is assigned by the BS to the P2P mobile station pair when they associate with each other and register at the base station. The P2P channel ID uniquely determines a peer-to-peer mobile station pair, the role of each MS in the peer-to-peer mobile station pair (i.e., transparent RS mobile station vs. mobile station), as well as the communication direction and communication channel between them. The remaining fields of the message 40, which are exactly the same as the UL-MAP message, indicate the position and amount of resources assigned to the peer-to-peer communication channel.

Figure 8:
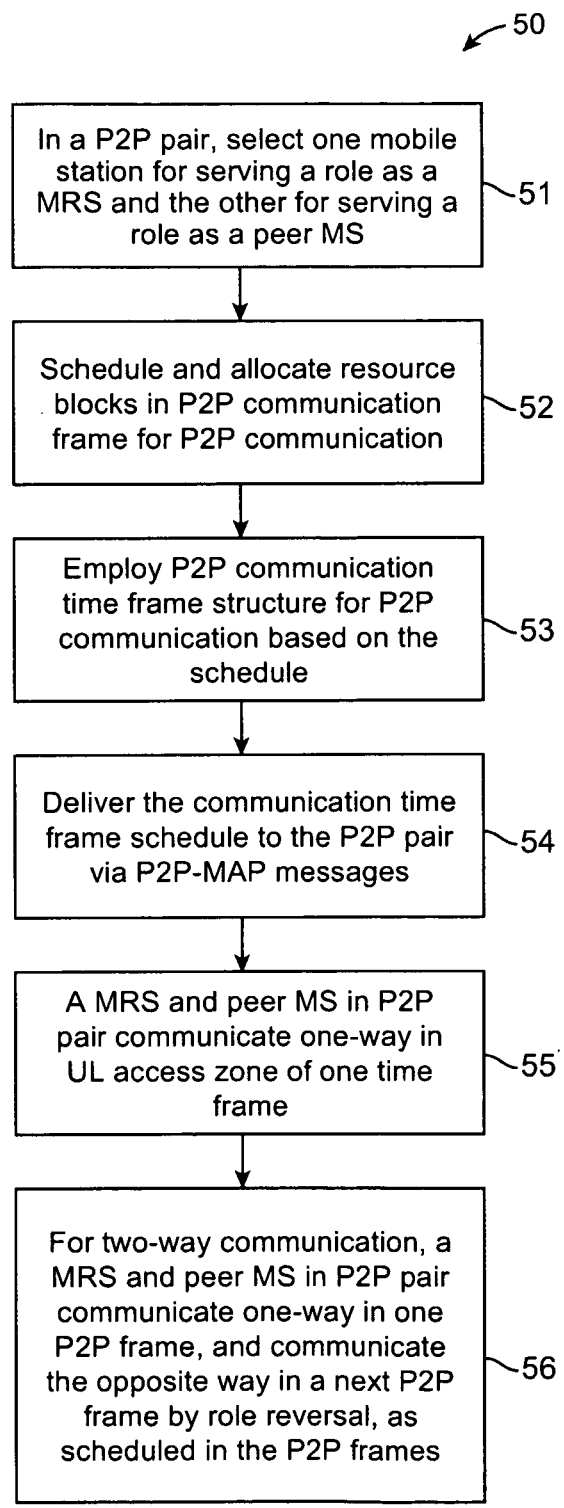
FIG. 8 shows a flowchart of a process for one-way P2P communication between mobile station pairs in each P2P enhanced frame, according to an embodiment of the invention.

FIG. 8 shows a flowchart of a process 50 for one-way communication between mobile station pairs in each P2P enhanced frame, according to an embodiment of the invention. The process 50 includes:

Block 51: For a P2P mobile station pair, according to a resource controller in the REC system, one of the mobile stations is selected for serving the role of a transparent RS (MRS), the other mobile station is selected for serving the role of a peer MS. Selection of a mobile station as a MRS is determined by the BS based on traffic demands from the P2P MS pair. For example, in a first scheme, if MS1 has data for MS2, then MS2 is selected as the MRS since only MS→MRS is allowed in scheme 1. In a second scheme, the role is decided by the BS based on both the traffic demands and the available resources in the UL zone and DL zone.

Block 52: The resource controller allocates and schedules resource blocks in the P2P enhanced frame, wherein resource allocation jointly considers station data traffic demands and available resources in time, frequency and space domains.

Block 53: The resource controller employs a P2P enhanced frame structure based on a modified IEEE 802.16j transparent/non-transparent relay frame structure, to support peer-to-peer communications among the P2P mobile station pair based on the resource allocation. In the P2P enhanced frame structure (e.g., FIG. 6), said transparent/non-transparent relay frame structures are integrated to support communication by both the MRS and the peer MS.

Block 54: The resource controller delivers resource allocation information representing the communication resource allocation in the P2P enhanced frame (i.e., peer-to-peer communication resource block information) to each P2P mobile station pair via a P2P-MAP message. In a P2P mobile station pair, when a peer MS is not directly served by the BS then the BS sends resource allocation information (i.e., peer-to-peer communication resource blocks) to the serving station (a non-transparent RS) of the peer MS, and that the serving station includes the resource allocation information in P2P-MAP messages and sends the messages to the peer MS. In the P2P-MAP, the P2P channel ID uniquely identifying a peer-to-peer mobile station pair, the role of each mobile station in the peer-to-peer mobile station pair (i.e., MRS vs. peer MS), as well as the communication direction and wireless communication channel information to be utilized by the MS pair for the P2P communication. The P2P-MAP message may be a standalone message or an extension of an UL-MAP message.

Block 55: Within each P2P enhanced frame structure, only one-way communication (e.g., from the peer MS to the MRS) is conducted. The P2P mobile station pair (MRS and peer MS) communicate one-way only in the UL access zone allocated in the P2P enhanced frame.

Block 56: For two-way communication, the MRS and peer MS alternately exchange their MRS and peer MS roles in subsequent P2P enhanced frames. The BS decides roles based on their traffic demands, and assigns the roles in the P2P-MAP message.

In one embodiment, said peer-to-peer communication protocol is jointly implemented by the mobile stations and the resource controller (hosted by the base station). The resource controller may utilize the BS station to deliver the P2P-MAP messages. The resource controller may further be a component of the BS, wherein the BS performs the resource scheduling/allocation and delivers the corresponding P2P-MAP messages.

Figure 9:
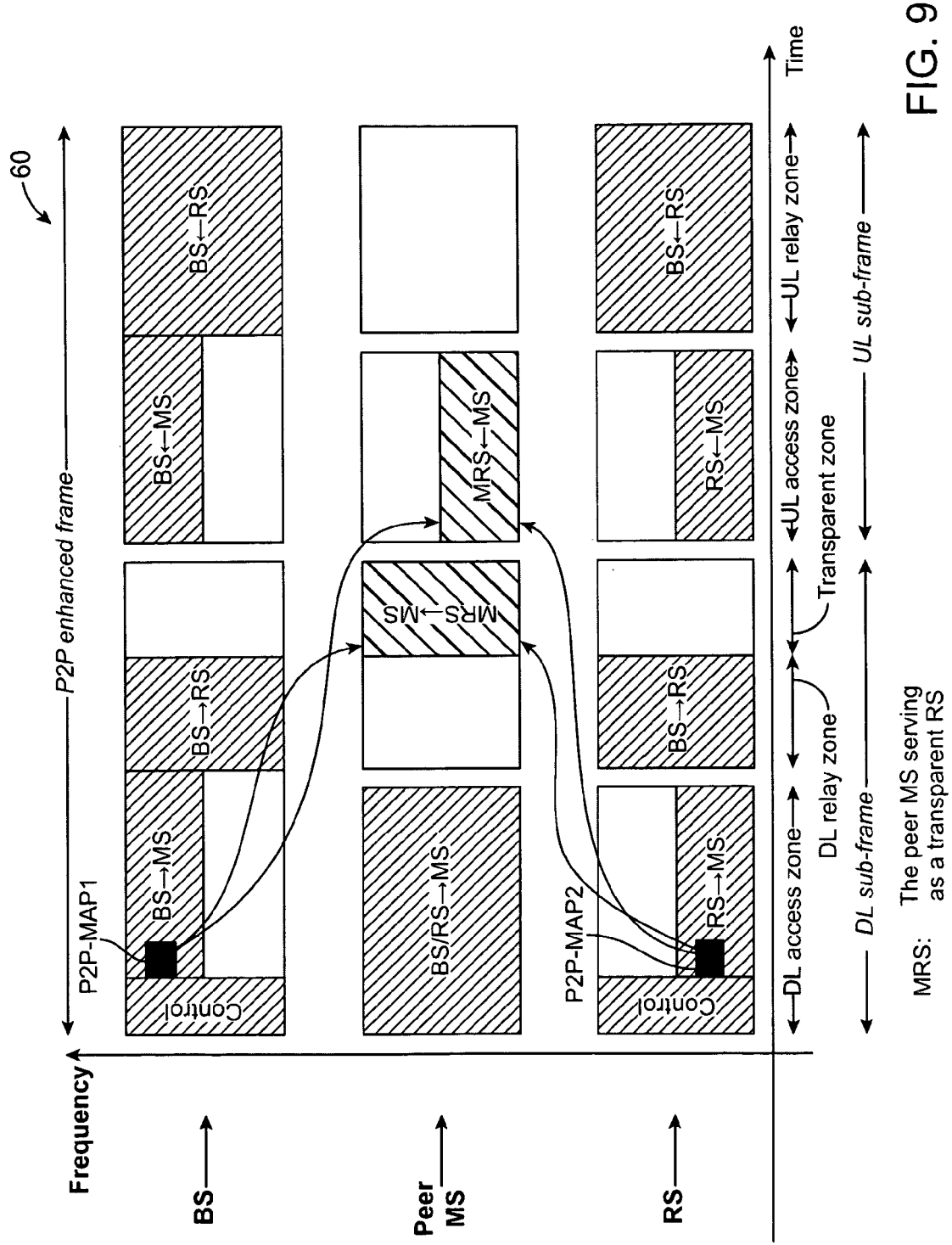
FIG. 9 shows an example P2P enhanced frame for two-way P2P communication, providing a resource allocation map and schedule for Peer-to-Peer communication between a pair of mobile stations, according to an embodiment of the invention.

A second implementation of a peer-to-peer communication protocol according to the invention provides two-way communication between a peer-to-peer mobile station pair within one P2P enhanced frame, based on the example resource allocation map in FIG. 9 illustrating another P2P enhanced frame structure communication 60. The P2P enhanced frame 60 includes a transparent RS zone ("Transparent zone") inserted right after the DL relay zone. In a peer-to-peer mobile station pair, a mobile station serving as the transparent RS (MRS) may transmit data to its peer mobile station in the transparent RS zone, while its peer mobile station (peer MS) may transmit data to the MRS in an UL access zone.

Again, the BS or the corresponding serving stations for the peer-to-peer mobile station pair, allocate resource blocks for the peer-to-peer communications in both the Transparent zone and the UL access zone. The resource mapping information according to the P2P enhanced frame 60 including allocated time periods and subcarriers is transmitted from the serving stations to the peer mobile stations via P2P-MAP messages, whereby peer mobile stations may engage in peer-to-peer communication. This peer-to-peer communication protocol enables flexible resource allocation and facilitates two-way communication between peer-to-peer mobile station pairs.

In FIG. 9, in an allocated frame (i.e., P2P enhanced frame) a P2P-MAP message is sent from serving stations to the P2P MS pair. If one or both MSs are directly served by the BS, the P2P-MAP message (i.e., P2P-MAP1) is sent from the BS to the MSs. If one or both MSs are served by a non-transparent RS, the P2P-MAP message (i.e., P2P-MAP2) is forwarded by the RS to the MSs.

Figure 10:
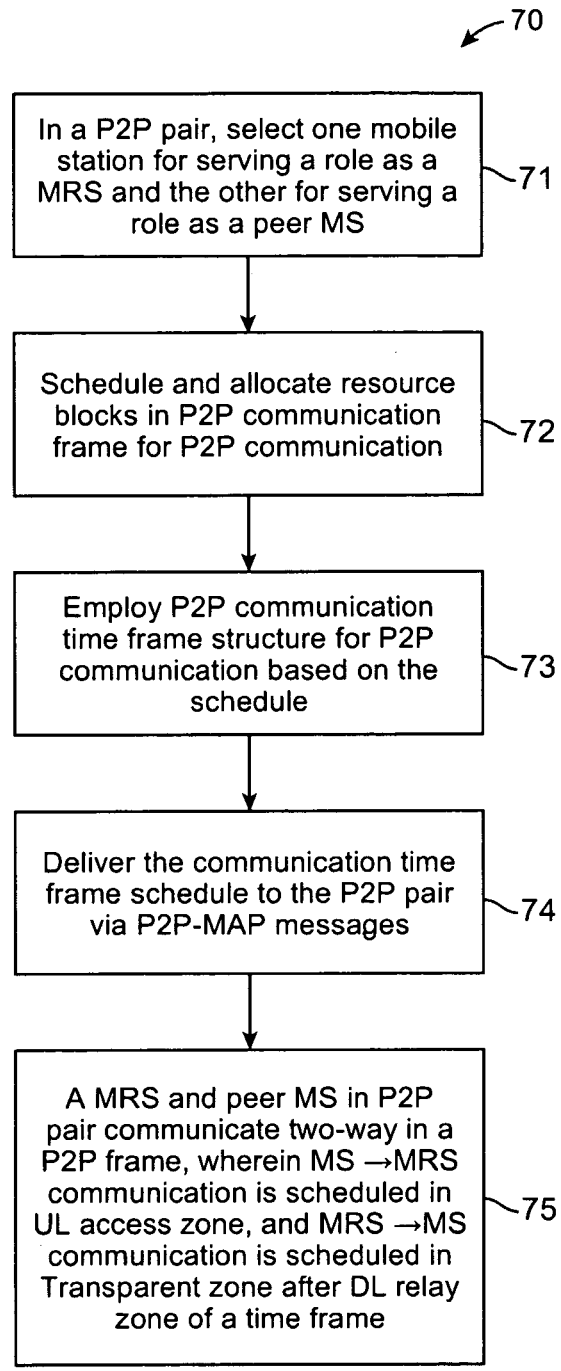
FIG. 10 shows a flowchart of a process for two-way P2P communication between mobile station pairs in each P2P enhanced frame, according to an embodiment of the invention.

FIG. 10 shows a flowchart of a process 70 for one-way communication between mobile station pairs in each P2P enhanced frame, according to another embodiment of the invention. The process 70 includes the following process blocks:

Block 71: For a peer-to-peer (P2P) mobile station pair, according to a resource controller in the REC system one of the mobile stations is selected for serving the role of a transparent RS (MRS), the other mobile station is selected for serving the role of a peer MS.

Block 72: The resource controller allocates and schedules resource blocks in the P2P enhanced frame for P2P communications, wherein resource allocation jointly considers station data traffic demands and available resource in time, frequency and space domains.

Block 73: The resource controller employs a P2P enhanced frame structure based on the IEEE 802.16j transparent/non-transparent relay frame structure to support peer-to-peer communications among the P2P mobile station pair based on the resource allocation. In the P2P enhanced frame structure (e.g., FIG. 9), said transparent/non-transparent relay frame structures are integrated to support communication by both the MRS and the peer MS.

Block 74: The resource controller delivers the resource allocation information (i.e., peer-to-peer resource block information) to each P2P mobile station pair via a P2P-MAP message. In a P2P mobile station pair, when a peer MS is not directly served by the BS, then the BS sends resource allocation information (i.e., peer-to-peer communication resource blocks) to the serving station (a non-transparent RS) of the peer MS, and that serving station includes the resource allocation information in P2P-MAP messages to send to the peer MS. In the P2P-MAP, the P2P channel ID uniquely identifying a peer-to-peer mobile station pair, the role of each MS in the peer-to-peer mobile station pair (i.e., MRS vs. peer MS), as well as the communication direction and wireless communication channel information to be utilized by the MS pair for the P2P communication. The P2P-MAP message may be a standalone message or an extension of a UL-MAP message.

Block 75: Within each P2P enhanced frame, two-way communication (e.g., from the peer MS to the MRS, and MRS to the MS) is conducted. For example, the MS→MRS communication is scheduled only in the UL access zone in the P2P enhanced frame, while MRS→MS communication is scheduled only in the Transparent zone inserted right after the DL relay zone in the P2P enhanced frame.

The resource controller may utilize the BS station to deliver the P2P-MAP messages. The resource controller may further be a component of the BS, wherein the BS performs the resource scheduling/allocation and delivers the corresponding P2P-MAP messages.

Figure 11:
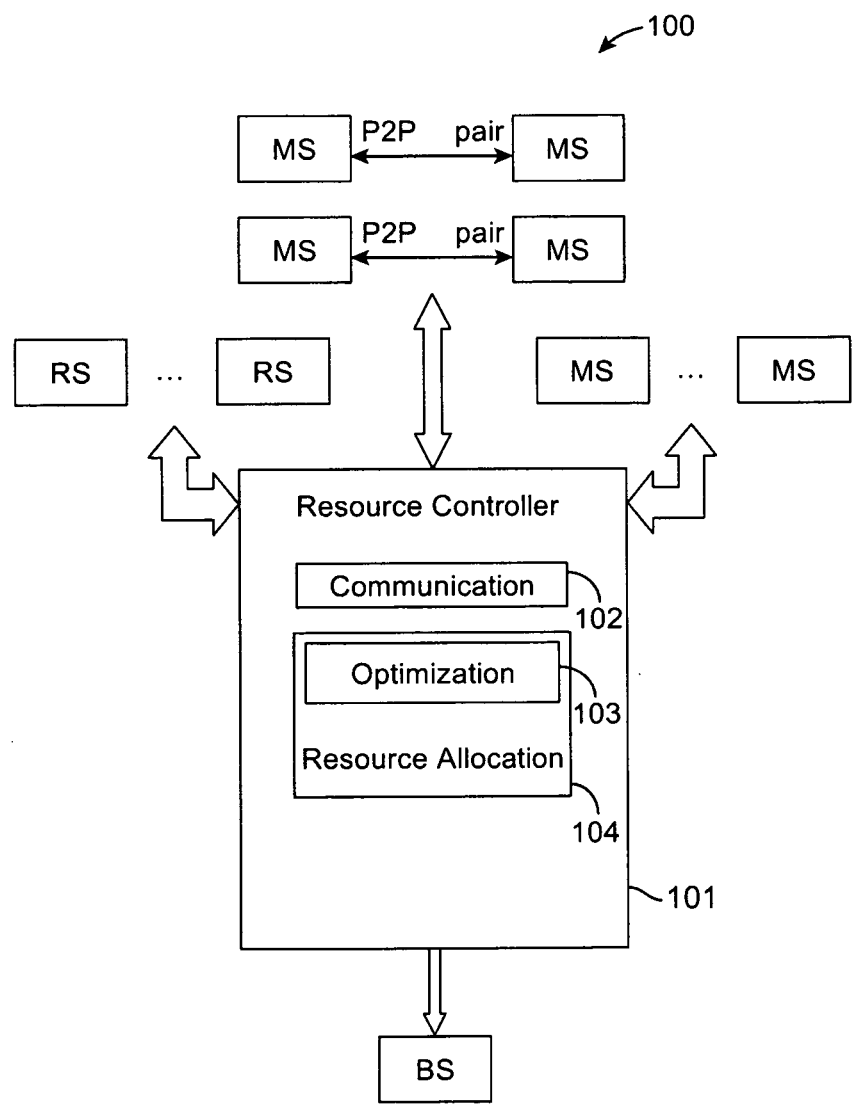
FIG. 11 shows a functional block diagram of a resource allocation controller configured for enabling Peer-to-Peer communication protocol between a pair of mobile stations in a relay enhanced cellular system, according to an embodiment of the invention.

FIG. 11 shows a functional block diagram of a relay enhanced cellular system 100 (such as REC system 10 in FIG. 4) wherein the relay enhanced cellular system 100 includes a resource controller 101, multiple relay stations RS, multiple mobile stations MS and a base station BS. The resource controller 101 is configured for enabling P2P mobile station communication, according to an embodiment of the invention. Each MS is configured to communicate with the other MSs directly, request P2P communication resource allocation from a BS or RS, and process P2P-MAP messages.

The resource controller 101 implements peer-to-peer communication protocol in a relay enhanced cellular system described above (e.g., FIGS. 8 and 10), according to the invention. The resource controller 101 includes a communication module 102, an optimization function 103 and a resource allocation module 104. The communication module 102 exchanges information with the RS and MS stations, and allows communication of P2P-MAP messages. The resource allocation module 104 is configured for generating P2P enhanced frames including resource allocations described above (e.g., FIGS. 6 and 9) for P2P communication between mobile stations in each P2P pair. The resource allocation module 104 may include an optimization function 103 that jointly considers data traffic demands and available resources in time, frequency and space domains, for determining communication resource allocations. The optimization function 103 may further determine link throughput and determine a balancing plan for allocation/reallocation/assignment of resources to the links in the REC system based on the link throughput.

The resource controller 101 may further include a configuration function (not shown) that communicates with the BS, RS and MS stations to configure them according to the resource allocation. The resource controller 101 may be a component of one or more of the BS, RS and MS stations, or a separate wireless station in the REC system.

The resource controller 101 may also be implemented in a distributed fashion among the BS, RS and MS stations.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Though the present invention has been described with reference to certain versions thereof; however, other versions are possible. Therefore, the spirit and scope of the appended claims should not be limited to the description of the preferred versions contained herein.

What is claimed is:

1. A method of communication between mobile stations in a wireless relay enhanced cellular (REC) communication system, comprising:
    providing a communication resource allocation for peer-to-peer (P2P) communication between a pair of mobile stations during a P2P enhanced time frame, wherein one mobile station is assigned a role as a transparent relay station (MRS) and another mobile station is assigned a role as a peer mobile station (MS) in the pair; and
    delivering resource allocation information comprising said communication resource allocation to the pair of mobile stations, for the mobile station pair to conduct P2P communication between the mobile station pair in the P2P enhanced time frame, wherein the resource allocation information comprises a message including an indication for P2P resource allocation information and an indication that identifies the role of each mobile station in the mobile station pair as a peer MS or a peer MRS,
    wherein the mobile station assigned as the MRS communicates directly with adjacent mobile stations, wherein an enhanced P2P frame structure for supporting communication by the MRS and peer mobile stations comprises a modified REC frame structure, wherein the modified REC frame structure comprises a single frame structure including transparent and non-transparent relay frame structures combined into the single frame structure, wherein control information is transmitted at a start of each enhanced P2P frame;
    wherein the message comprises a P2P-MAP message that includes a modified field format based on a portion of a UL-MAP message format, wherein the indication comprises a P2P channel ID field that identifies the role of each mobile station in the mobile station pair as the peer MS or the peer MRS,
    wherein the P2P channel ID field comprises information that:
        uniquely identifies a P2P mobile station pair,
        identifies communication direction, and
        identifies communication channel information.

2. The method of claim 1 further comprising:
    allocating communication resources comprises jointly considering station data traffic demands and available resources in time, frequency and space domains;
    wherein the resource allocation information further includes communication resource allocation information comprising communication periods and frequency subcarriers.

3. The method of claim 2 wherein the resource allocation information provides for one-way communication between the mobile station pair in a P2P enhanced time frame.

4. The method of claim 3 wherein the resource allocation information provides for only one-way communication between the mobile station pair during an uplink (UL) access zone allocated in the P2P enhanced time frame.

5. The method of claim 4 further comprising:
providing a next communication resource allocation for a subsequent P2P enhanced time frame reversing said assigned roles of the mobile station pair, and reversing direction of communication between the mobile station pair during said subsequent P2P enhanced time frame.

6. The method of claim 2 wherein the resource allocation information provides for two-way communication between the mobile station pair in a P2P enhanced time frame.

7. The method of claim 6 wherein the resource allocation information provides for two-way communication between the mobile station pair in the P2P enhanced time frame, including peer MS to MRS (peer MS→MRS) communication during an uplink (UL) access zone allocated in the P2P enhanced time frame, and MRS to peer MS (MRS→peer MS) communication during a transparent zone immediately after a downlink (DL) relay zone allocated in the same P2P enhanced time frame.

8. The method of claim 3 wherein the resource allocation information provides for only one-way communication between the mobile station pair in each P2P enhanced time frame.

9. The method of claim 4, wherein the assigned role as the transparent relay station (MRS) and the assigned role as the peer mobile station in the pair of mobile stations reverse in each subsequent P2P enhanced time frame to provide one-way communication between the pair of mobile stations in reverse order.

10. The method of claim 1, wherein the mobile station assigned the role of the MRS maintains communication with a wireless base station (BS) or other relay stations (RSs).

11. The method of claim 1, wherein the mobile station assigned the role as the MRS communicates directly with adjacent mobile stations and at the same time maintains communication with a wireless base station (BS) or other relay stations (RSs).

12. The method of claim 1, wherein the enhanced P2P frame structure provides a resource allocation map for P2P communication in the wireless REC communication system.

13. The method of claim 12, wherein resource blocks are scheduled in the enhanced P2P frame structure.

14. The method of claim 12, wherein the resource allocation map for P2P communication in the wireless REC communication system provides resource allocation including communication time periods and frequency subcarriers.

15. The method of claim 1, wherein mobile stations communicate directly with one another under point-to-multipoint (PMP) and mobile multihop relay (MMR) modes using the modified REC frame structure.

16. The method of claim 1, wherein the mobile station assigned the role as the MRS transmits control information and participates in resource scheduling.

17. The method of claim 1, wherein P2P communication protocol of the wireless REC communication system provides direct communications between mobile stations.

18. The method of claim 1, wherein the assigned role as the transparent relay station (MRS) and the assigned role as the peer mobile station (MS) in the pair of mobile stations is reversed in each subsequent P2P enhanced time frame for providing two-way communication between the pair of mobile stations based on a series of one-way communications from the station having a current assigned role of the MS to the station having a current assigned role of the MRS.

19. The method of claim 1, wherein a base station assigns the roles for the MRS and the peer mobile station in the pair.

20. The method of claim 19, wherein the assigned roles for the MRS and the peer mobile station in the pair are determined based on traffic demands.

21. The method of claim 20, wherein the assigned roles for the MRS and the peer mobile station in the pair are assigned in the control information.

22. The method of claim 1, wherein the modified REC flame structure enables P2P communications from at least one resource block.

23. The method of claim 1, wherein the modified REC flame structure enables P2P communications from only one or two resource blocks.

24. The method of claim 1, wherein the modified REC flame structure comprises a modified IEEE P802.16j relay station communication flame structure for supporting P2P communications among mobile stations.

25. The method of claim 1, wherein the P2P-MAP message comprises a separate message from a UL-MAP message.

26. The method of claim 1, wherein the P2P-MAP message comprises an extension of a UL-MAP message.

27. The method of claim 1, wherein the P2P channel ID field information is assigned by a wireless base station (BS) to a P2P mobile station pair when the P2P mobile station pair associates with each other and registers at the BS.

28. A relay enhanced cellular (REC) wireless communication system, comprising:
multiple mobile stations; and
a resource controller provides a communication resource allocation for peer-to-peer (P2P) communication between a pair of mobile stations during a P2P enhanced time frame wherein one mobile station is assigned a role as a transparent relay station (MRS) and another mobile station is assigned a role as a peer mobile station (MS) in the pair, and delivers resource allocation information comprising communication periods and frequency subcarriers to the pair of mobile stations, for the mobile station pair to conduct one-way communication between the mobile station pair in the P2P enhanced time frame, wherein the resource allocation information comprises a message including an indication for P2P resource allocation information and an indication that identifies the role of each mobile station in the mobile station pair as a peer MS or a peer MRS, wherein the mobile station assigned as the MRS communicates directly with adjacent mobile stations,
wherein an enhanced P2P frame structure for supporting communication by the MRS and peer mobile stations comprises a modified REC frame structure, wherein the modified REC frame structure comprises a single frame structure including transparent and non-transparent relay frame structures combined into the single frame structure, wherein control information is transmitted at a start of each enhanced P2P frame;
wherein the message comprises a P2P-MAP message that includes a modified field format based on a portion of a UL-MAP message format, wherein the indication comprises a P2P channel ID field that includes information that:
uniquely identifies a P2P mobile station pair,
identifies the role of each mobile station in the P2P mobile station pair as the peer MS or the peer MRS,
identifies communication direction, and
identifies communication channel information.

29. The system of claim 28 wherein the resource controller further comprises an optimization function that allocates communication resources by jointly considering station data traffic demands and available resources in time, frequency and space domains, wherein the resource allocation information further includes communication resource allocation information.

30. The system of claim 29 wherein the resource allocation information provides for one-way communication between the mobile station pair in a P2P enhanced time frame.

31. The system of claim 30 wherein the resource allocation information provides for only one-way communication between the mobile station pair during an uplink (UL) access zone allocated in the P2P enhanced time frame.

32. The system of claim 29 wherein the resource allocation information provides for two-way communication between the mobile station pair in a P2P enhanced time frame.

33. The system of claim 32 wherein the resource allocation information provides for two-way communication between the mobile station pair in the P2P enhanced time frame, including peer MS to MRS (peer MS→MRS) communication during an uplink (UL) access zone allocated in the P2P enhanced time frame, and MRS to peer MS (MRS→peer MS) communication during a transparent zone immediately after a downlink (DL) relay zone in the same P2P enhanced time frame.

34. The system of claim 30 wherein the resource allocation controller further provides a next communication resource allocation for a subsequent P2P enhanced time frame reversing said assigned roles of the mobile station pair, and reversing direction of communication between the mobile station pair during said subsequent P2P enhanced time frame.

35. The system of claim 28 further comprising a base station including said resource allocation controller.

36. A computer program product for mobile station communication in a relay enhanced cellular (REC) wireless communication system, the computer program product comprising:
a non-transitory computer usable medium having computer readable program code embodied therewith, wherein the computer readable program when executed on the computer causes the computer to:
provide a communication resource allocation for peer-to-peer (P2P) communication between a pair of mobile stations during a P2P enhanced time frame wherein one mobile station is assigned a role as a transparent relay station (MRS) and another mobile station is assigned a role as a peer mobile station (MS) in the pair; and deliver resource allocation information comprising said communication resource allocation to the pair of mobile stations, for the mobile station pair to conduct P2P communication between the mobile station pair in the P2P enhanced time frame, wherein the resource allocation information comprises a message including an indication for P2P resource allocation information and an indication that identifies the role of each mobile station in the mobile station pair as a peer MS or a peer MRS, wherein the mobile station assigned the role of the MRS communicates directly with adjacent mobile stations,
wherein an enhanced P2P frame structure for supporting communication by the MRS and peer mobile stations comprises a modified REC frame structure, wherein the modified REC frame structure comprises a single frame structure including transparent and non-transparent relay frame structures combined into the single frame structure, wherein control information is transmitted at a start of each enhanced P2P frame;
wherein the message comprises a P2P-MAP message that includes a modified field format based on a portion of a UL-MAP message format, wherein the indication comprises a P2P channel ID field that includes information that:
uniquely identifies a P2P mobile station pair,
identifies the role of each mobile station in the P2P mobile station pair as the peer MS or the peer MRS,
identifies communication direction, and
identifies communication channel information.

37. The computer program product of claim 36 further comprising computer readable program code for:
allocating communication resources comprises jointly considering station data traffic demands and available resources in time, frequency and space domains;
wherein the resource allocation information further includes communication resource allocation information.

38. The computer program product of claim 37 wherein the resource allocation information provides for only one-way communication between the mobile station pair in a P2P enhanced time frame.

39. The computer program product of claim 38 wherein the resource allocation information provides for one-way communication between the mobile station pair during an uplink (UL) access zone allocated in the P2P enhanced time frame.

40. The computer program product of claim 37 wherein the resource allocation information provides for two-way communication between the mobile station pair in a P2P enhanced time frame.

41. The computer program product of claim 40 wherein the resource allocation information provides for two-way communication between the mobile station pair in the P2P enhanced time frame, including peer MS to MRS (peer MS→MRS) communication during an uplink (UL) access zone allocated in the P2P enhanced time frame, and MRS to peer MS (MRS→peer MS) communication during a transparent zone immediately after a downlink (DL) relay zone in the P2P the same P2P enhanced time frame.

42. The computer program product of claim 38 further computer readable program code for:
providing a next communication resource allocation for a subsequent P2P enhanced time frame reversing said assigned roles of the mobile station pair, and reversing direction of communication between the mobile station pair during said subsequent P2P enhanced time frame.

* * * * *